US011153618B1

(12) United States Patent
Toner et al.

(10) Patent No.: US 11,153,618 B1
(45) Date of Patent: *Oct. 19, 2021

(54) SYSTEM AND METHOD FOR SET TOP BOX VIEWING DATA

(71) Applicant: CSC Holdings, LLC, Bethpage, NY (US)

(72) Inventors: Gemma Toner, Oyster Bay, NY (US); Colleen Moraghan, Cold Spring Harbor, NY (US); Richard Neill, Syosset, NY (US); Alejandro A. Hoyos, Jericho, NY (US); John McKenna, North Port, NY (US); Laurie Martone, Sea Cliff, NY (US); Rohit Bansal, Plainview, NY (US)

(73) Assignee: CSC Holdings, LLC, Bethpage, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 15/864,654

(22) Filed: Jan. 8, 2018

Related U.S. Application Data

(63) Continuation of application No. 15/463,399, filed on Mar. 20, 2017, now Pat. No. 9,877,052, which is a
(Continued)

(51) Int. Cl.
*H04N 21/25* (2011.01)
*H04N 21/258* (2011.01)
(Continued)

(52) U.S. Cl.
CPC ....... *H04N 21/251* (2013.01); *H04N 21/2407* (2013.01); *H04N 21/25808* (2013.01);
(Continued)

(58) Field of Classification Search
CPC ............ H04N 21/251; H04N 21/2407; H04N 21/25808; H04N 21/25866; H04N 21/44222; H04N 21/44204; H04N 21/6543
See application file for complete search history.

(56) References Cited

U.S. PATENT DOCUMENTS

| | | | |
|---|---|---|---|
| 6,530,082 B1 * | 3/2003 | Del Sesto | H04H 20/38 348/E7.071 |
| 6,983,478 B1 | 1/2006 | Grauch et al. | |

(Continued)

OTHER PUBLICATIONS

U.S. Appl. No. 13/833,293, filed Mar. 15, 2013, entitled "Optimizing Inventory Based on Predicted Viewership".
(Continued)

*Primary Examiner* — Oschta I Montoya
(74) *Attorney, Agent, or Firm* — Sterne, Kessler, Goldstein & Fox P.L.L.C.

(57) ABSTRACT

In a video delivery context, collection and analysis of viewing data can provide insight into viewer interaction with video and the Internet. The viewing data can be transmitted in a controlled manner to a data repository. The system can selectively target specific viewers/households to obtain viewing data, which can be combined with demographics, anonymized, and encrypted. Embodiments enable precision selection of media opportunities, by determining detailed characteristics associated with broadcasts including movement of audiences and specific viewer behavior, such as visits to websites on the Internet. The effective yield of broadcasts, including promotional spots and advertisements, can be determined and predicted based on concrete data at a level of detail down to individual viewers. Accordingly, embodiments enable improvement of the effectiveness and return on investment for programming, promotional spots, and advertisements.

20 Claims, 6 Drawing Sheets

Related U.S. Application Data continuation of application No. 14/754,498, filed on Jun. 29, 2015, now Pat. No. 9,635,402, which is a continuation of application No. 12/849,630, filed on Aug. 3, 2010, now Pat. No. 9,071,370.

(60) Provisional application No. 61/346,731, filed on May 20, 2010.

(51) Int. Cl.
    *H04N 21/442*      (2011.01)
    *H04N 21/6543*      (2011.01)
    *H04N 21/24*      (2011.01)

(52) U.S. Cl.
    CPC . *H04N 21/25866* (2013.01); *H04N 21/44204* (2013.01); *H04N 21/44222* (2013.01); *H04N 21/6543* (2013.01)

(56) References Cited

U.S. PATENT DOCUMENTS

| | | | |
|---|---|---|---|
| 7,729,940 B2 | 6/2010 | Harvey et al. | |
| 8,549,561 B2 | 10/2013 | Yeh et al. | |
| 9,071,370 B2 | 6/2015 | Toner et al. | |
| 9,635,402 B1 | 4/2017 | Toner et al. | |
| 2003/0188308 A1* | 10/2003 | Kizuka | H04H 60/46 725/32 |
| 2003/0229892 A1 | 12/2003 | Sardera | |
| 2005/0278731 A1* | 12/2005 | Cameron | H04H 60/66 725/14 |
| 2007/0157247 A1 | 7/2007 | Cordray et al. | |
| 2007/0214470 A1 | 9/2007 | Glasgow et al. | |
| 2007/0271580 A1 | 11/2007 | Tischer et al. | |
| 2008/0040742 A1* | 2/2008 | Howcroft | H04N 7/17327 725/34 |
| 2008/0248815 A1 | 10/2008 | Busch | |
| 2008/0294384 A1 | 11/2008 | Fok et al. | |
| 2009/0150224 A1 | 6/2009 | Lu et al. | |
| 2010/0333125 A1 | 12/2010 | Eldering et al. | |
| 2011/0153208 A1 | 6/2011 | Kruglick | |
| 2012/0331494 A1 | 12/2012 | Pomtual et al. | |
| 2013/0019009 A1 | 1/2013 | Tremblay et al. | |

OTHER PUBLICATIONS

U.S. Appl. No. 15/463,399, filed Mar. 20, 2017, entitled "System and Method for Set Top Box Viewing Data".

\* cited by examiner

SYSTEM AND METHOD FOR SET TOP BOX VIEWING DATA

CROSS REFERENCE TO RELATED APPLICATIONS

This application is a continuation of U.S. patent application Ser. No. 15/463,399, filed Mar. 20, 2017, now U.S. Pat. No. 9,877,052, which is a continuation of U.S. patent application Ser. No. 14/754,498, filed Jun. 29, 2015, now U.S. Pat. No. 9,635,402, which is a continuation of U.S. patent application Ser. No. 12/849,630, filed Aug. 3, 2010, now U.S. Pat. No. 9,071,370, which claims the benefit of U.S. Provisional Appl. No. 61/346,731 filed on May 20, 2010, all of which are hereby incorporated by reference in their entireties.

BACKGROUND

Field of the Invention

Embodiments relate generally to television or other video programming viewing data received from a set top box, and more particularly to handling of such viewing data including collection, transmission, storage, analysis, modification, and application of the viewing data.

Background Art

A set top box, or STB, is generally deployed at a viewer's household or business (customer premise) to provide the viewer with the ability to control delivery of video programming from a provider. The viewer can issue control commands to the Si'B, for example, powering on the STB, tuning to a specific channel, and tuning to other specific channels over time. A customer can also send and receive data to and from the provider, for example, via an Internet connection. A viewer may simultaneously, but separately, interact with the Internet and video programing. For example, the viewer can access the Internet in response to video programming, either separately through a PC, or perhaps through a browser-enabled STB.

Conventional viewing data collection systems are limited in a number of ways: either in the number of viewers, in the number of viewer control events, or even excluding simultaneous or related Internet activity. Viewing data collection is typically limited to a particular set of target households, sampled at limited intervals. What is needed is an arrangement that enables significant flexibility and, accuracy associated with viewing data, including tracking viewing data associated with broadcast network video programming, as well as simultaneous or related Internet usage. Furthermore, what is needed is an arrangement that enables a high degree of control and specificity associated with handling of viewing data.

BRIEF DESCRIPTION OF THE DRAWINGS/FIGURES

The accompanying drawings are included to provide further understanding, are incorporated in and constitute a part of this specification, and illustrate embodiments that, together with the description, serve to explain the principles of the invention. In the drawings.

The present embodiments will now be described with reference to the accompanying drawings. In the drawings, like reference numbers may indicate identical or functionally similar elements.

DETAILED DESCRIPTION

While the present invention is described herein with reference to illustrative embodiments for particular applications, it should be understood that the invention is not limited thereto. Those skilled in the art with access to the teachings provided herein will recognize additional modifications, applications, and embodiments within the scope of the invention and additional fields in which the invention would be of significant utility.

Collection and analysis of viewing data can provide a flexible, configurable, scalable method to capture STB and Internet events, and transmit the viewing data in a controlled manner to a database repository, e.g., a data warehouse, head-end based repository, or the like. The system can target specific viewers/households to obtain viewing data including Internet and STB usage, and can anonymize and encrypt the viewing data. The system has flexibility in controlling how and when collected viewing data is transferred to a repository, preventing spikes in network traffic.

Arrangements can collect anonymous viewing data from a sample of households. The sample configuration can be chosen randomly or according to preselected criteria. The collected viewing data can be combined with sales, demographic and sociographic characteristics of the households, while maintaining the anonymity of the viewing households. Accordingly, the arrangement provides a very detailed understanding of viewing patterns, including television programming, commercials, and Internet usage, while maintaining anonymity. The data is available for use on a near real-time basis.

The specific illustrations and embodiments are described with respect to a STB and/or television in connection with data within a service-provider managed network. Embodiments also can be applied to various platforms including personal computers, cellular telephones, personal digital assistants (PDAs), tablets (e.g., Apple® iPad™), and other mobile devices, Internet Protocol (IP)-based telephones using voice over IP (VOIP), digital video recorders (DVRs), remote-storage DVRs, video on-demand (VOD) systems, interactive TV systems, and other systems capable of receiving and displaying video and/or utilizing a network connection such as the Internet. References to a STB should therefore be interpreted to include these and other similar systems involving display of video and viewer input.

Collection and Storage of Viewing Data

Figure 1:
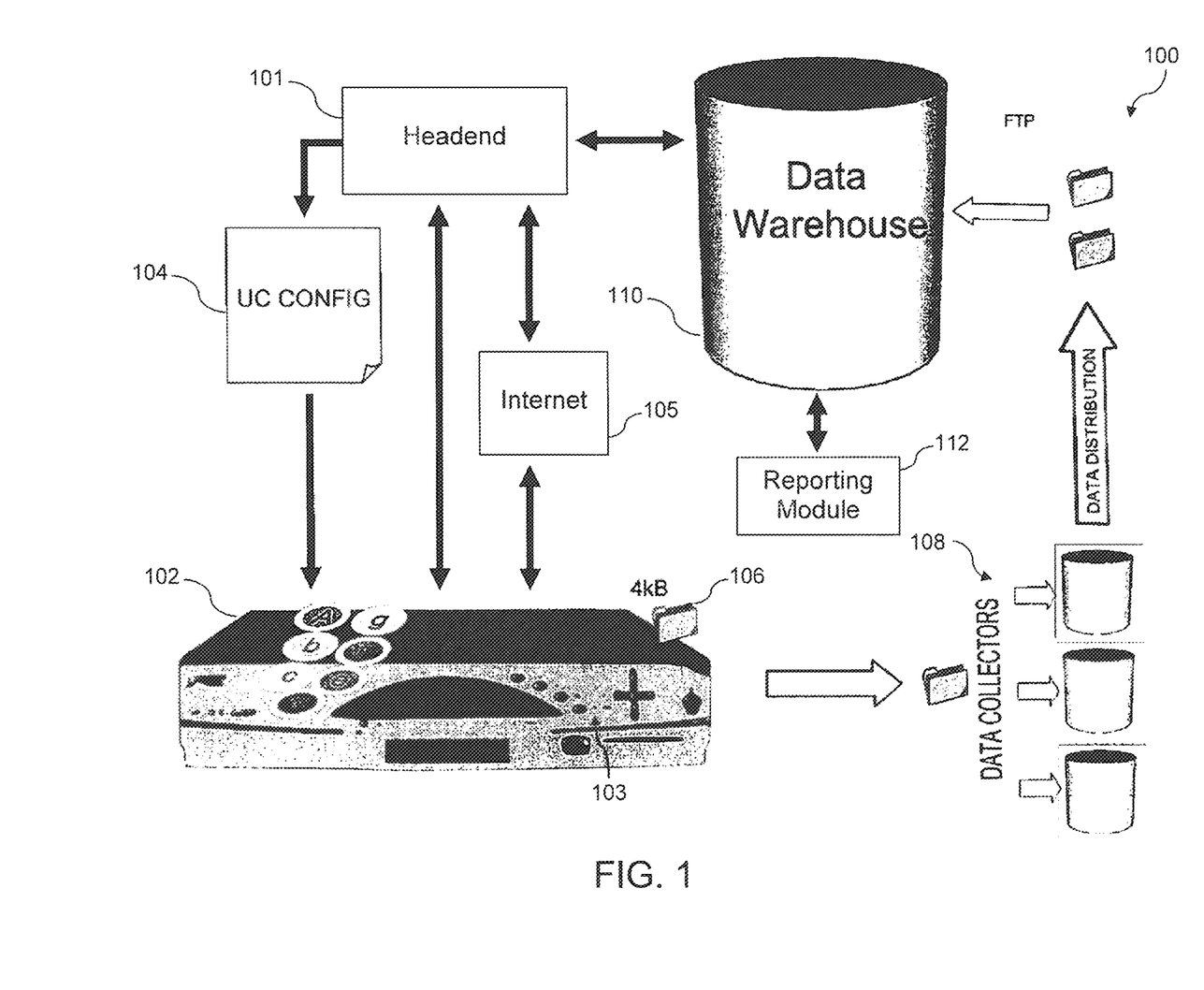
FIG. 1 is a block diagram of an architecture of a video and Internet system including collection of viewing data according to an embodiment.

FIG. 1 illustrates a block diagram of an architecture of a video system 100 including collection of viewing data from within a service-provider managed network according to an embodiment. Video system 100 includes STB 102. Exemplary STB 102 can include, without limitation, an Internet Protocol (IP)-based (i.e., IPTV) STB. Embodiments are not limited to this exemplary STB, and it would be apparent to those skilled in the art that other STBs can be used in embodiments described herein, including personal computers. Many additional STBs can be used with the system 100, although only STB 102 is illustrated in FIG. 1. A network-connected device separate from STB 102, such as a personal computer, can be connected to the Internet 105, although not specifically illustrated. Accordingly, the headend 101 can receive and monitor viewing data associated with viewer interaction with the Internet 105 or video programming. STB 102 can also interact with viewing data.

STB 102 is configured to interact with media including receiving video broadcast and the Internet 105 from headend 101, The STB 102 receives operational commands from a viewer, including tuning actions. A remote control (not shown) may be used to control operation of STB 102. Some set-top boxes may have controls 103 thereon not requiring the use of a remote control. The remote control is configured with buttons to control the STB 106, including play, pause, stop, etc.

The STB 102 can be configured to receive usage collection configuration information (UC Config 104). As illustrated, UC Config 104 is sent, from the headend 101, although UC Config 104 can be sent from alternate sources, e.g., via the Internet, and UC Config 104 can be stored on and updated at the STB 102. The STB 102 can also be programmed to implement tools used for capturing viewing activity. SIB 102 can receive updates to re-program the STB 102 and associated tools.

UC Config 104 can instruct the STB 102 to selectively collect, store, and send viewing data 106. Programming information associated with video broadcasts received from headend 101 can be included in viewing data 106. Programming information can include, for example, a name of a broadcast program or promotional spot/advertisement, along with other identifying information. Viewing data 106 can also include operational commands from the viewer. Viewing data 106 can be associated with a household, and can include an anonymous tracking number corresponding to the household, specific equipment used, the date and time in seconds, the channel tuned, and the duration in seconds of the viewing of that channel before the channel was changed or the STB 102 was powered off.

Viewing data 106 can be collected without specific programming information such as the name of programming and advertisements/promos. Excluding such data can reduce the total amount of viewing data stored, transmitted, etc. The specific programming information can be recovered by combining viewing data 106 with, for example, program content logs and as-run advertising logs. The specific programming information is accurately correlated with the viewing data 106 based on, for example, timestamps included in the viewing data 106 and the logs.

Viewing data 106 can include additional data. For example, viewing data 106 can include interaction with Internet 105. Headend 101 controls access to Internet 105, and can therefore monitor viewer interaction over Internet 105 for storage with viewing data 106. Alternatively, STB 102 can store viewing data 106 associated with viewer interaction with the Internet 105. It is also contemplated that specific Internet connected devices, separate from STB 102, can report viewing data 106 to the headend 101, STB 102, data collectors 108, etc. along with timestamp information that can be used to correlate the Internet activity.

In one embodiment, information about household members can be collected and stored, for example at the head end or other repository. Information can include, without limitation, name, address (including zip code), and age. Other demographic and/or geographic information can also be collected. Alternatively, a third party can provide data. Also, information such as brand/type/model of television, phone, computer, PDA, mobile device, etc. could also be collected. This information can then be associated with viewing data. However, the data can be made anonymous (e.g., removing specifically identifying information).

STB 102 can be instructed to collect viewing data 106 continuously over time. STB 102 can also be instructed to collect viewing data at intervals, or at specific times associated with a change in any parameter including changes in viewing data, programming, promotional spots, advertisements, and overlays.

For example, video programming from headend 101 can include interactive overlays. Overlays can include promotional information such as a link to a website. Because the video system 100 includes monitoring of Internet 105, it is possible to collect data including a viewer's interaction with Internet 105. Internet interaction data can be stored along with viewing data 106, and can also be maintained separately along with timestamps for correlating the data over time.

STB 102 can be instructed to collect viewing data 106 associated with events. For example, the STB 102 can collect a sampling of viewing data 106 continuously or with the passage of time, e.g., every second. The term continuous is used herein to mean substantially uninterrupted. The term periodically means more often than on the half-an-hour. This allows a more granular view of the viewing habit of a sample audience. Additionally, the STB 102 can collect viewing data 106 when the STB 102 receives an operational command from the viewer, or when Internet activity is detected. The STB 102 can also collect viewing data 106 associated with a change in video broadcast programming. For example, the STB 102 can collect first viewing data 106 upon receiving an operational command to tune to a specific broadcast channel, second viewing data 106 associated with a first commercial break on the tuned channel, third viewing data 106 associated with tuning to a different channel, fourth viewing data 106 associated with tuning back to the original channel, and fifth viewing data 106 associated with Internet activity. Events can be associated with a high priority, to ensure that collecting viewing data 106 is triggered by the occurrence of a high priority event. Each data collection includes a timestamp, which can be used to correlate the data collection and also identify an amount of time spent on an activity relative to the prior or next data collection (including turning off the STB 102).

The STB 102 can be configured to include a dwelling time associated with a duration of an activity, e.g., a duration that the STB 102 has been tuned to a channel. The dwelling time can be used as a factor in determining a granularity associated with whether to collect viewing data. For example, the STB 102 can be configured to include a dwelling time of 10 seconds, such that viewing data 106 is recorded only for events equal to or greater than 10 seconds in duration. Accordingly, the STB 102 can exclude "channel surfing" sessions wherein a viewer rapidly tunes through a series of channels, spending less than the dwelling time (e.g., 10 seconds) viewing each channel. Accordingly, the STB 102 can conserve resources by storing viewing data that is more likely to reflect attentive viewing and not merely channel surfing. However, the STB 102 can record all events continuously, and can utilize data compression to reduce system storage and transmission loads, regardless of whether "channel surfing" data is included.

The STB 102 can store the viewing data 106 in a format referred to as usage collection data events (UC Data), although many additional formats can be used with the system 100. The system 100 can utilize compression and record splitting, for example, to improve transmission and storage efficiency.

Viewing data 106 can also include information regarding the type of equipment used by the viewer. For example, viewing data 106 can identify the specific STB equipment, such as a brand and model of STB 102, including whether STB 102 is digital or IP-based. Although not specifically illustrated, the system 100 can include a personal computer or the like, configured to interact with the Internet 105, receive video broadcast from headend 101, or interact with a viewer for video control and display. Such devices can include cellular telephones, tablet computers, or other devices configured to interact with a network or the Internet 105. Accordingly, the personal computer can collect, store, send, and otherwise interact with viewing data 106 and Internet 105 as would the STB 102. Headend 101 controls the data connection for Internet 105, and therefore can monitor the Internet activity for a household or individual viewer.

Such viewing and Internet activity can include activity initiated on a viewer's cellular telephone. For example, a cellular telephone can interact with the Internet using a wireless Internet Protocol (IP)-based connection, e.g., IEEE 802.11 wireless local area network (WLAN) computer communication ("WIFI"). Also, a household can include a wireless cellular network extender that utilizes the Internet 105 and allows cellular telephones to connect via their native wireless cellular connection. Embodiments can also include Internet Protocol (IP)-based telephones using voice over IP (VOIP). Accordingly, video system 100 can monitor many types of Internet activity at the household.

The system 100 can include very specific, individualized monitoring and data collection. For example, viewers can be associated with a unique identification (ID) or login. Examples of unique IDs include biometrics such as fingerprint, retina scan, or the like, text-based logins/passwords, radio-frequency identification (RFD), cellular telephone-based identification, or the like. The STB 102 can include readers for monitoring and accepting such individual, unique IDs from each viewer. System 100 can also implement customizable icons or avatars associated with each unique ID, as well as the entire family or household, to encourage viewers to login and utilize the unique IDs.

It is also contemplated that data associated with viewer equipment will be associated with the viewer data 106. For example, the fact that multiple viewers access the Internet 105 via an Apple® computer after viewing a commercial might suggest that an advertisement for Apple® would be appropriate for this time slot.

Viewing data 106 can be maintained anonymously. For example, viewing data 106 can be collected without reference to metrics that can be used to specifically identify a viewer or a household, such as an Internet Protocol (IP) number assigned to the household and associated with an account maintained by a resident at the household. Alternatively, all aspects of viewing data 106 can be collected, and specifically identifying metrics can be removed for anonymity.

Viewing data 106 can be stored at the STB 102 prior to transmission to data warehouse 110. Accordingly, network traffic can be managed by varying the transmission of viewing data 106. UC Config 104 can instruct the STB 102 to selectively transmit the viewing data 106 to data collectors 108. STB 102 can selectively transmit the viewing data 106 based on various factors, such as the factors used for selective collection of viewing data 106 as set forth above. For example, viewing data 106 can be transmitted once per day, at random times. It can also be sent periodically during the day (e.g., every half-an-hour) and/or sent at more- or less-frequent intervals. Viewing data 106 can be transmitted when a threshold amount of viewing data 106 has been collected, when a storage buffer of the STB 102 reaches a specified capacity, and/or when a transmission triggering event occurs. The threshold, specified capacity, and/or event can be adjusted independently of specific hardware configurations. Data collectors 108 can distribute the viewing data 106 to data warehouse 110. As illustrated, data warehouse 110 can be in communication with headend 101, such that headend 101 can interact with and monitor viewing data 106 stored at data warehouse 110. Headend 101 can serve as a temporary collection point, that then moves data to a data warehouse where it is combined with other source data to create a rich profile of customer interactions.

Reporting and analysis can be performed on the enriched, combined data. As illustrated, reporting module 112 can be in communication with data warehouse 110 to provide various reports based on viewing data 106 at data warehouse 110. Although one reporting module 112 is shown, multiple reporting modules can be provided in communication with various components of video system 100.

The data transmitted from STB 102 to the headend 101 may be encrypted prior to transmission for security purposes. The data transmitted from STB to the headend could then be made anonymous prior to encryption and transmission.

Viewing data 106 can be identified by attribute and category. Such identifications can relate to measurable aspects of viewing data 106, and can also relate to aspects of viewing data 106 that are determined by analysis (performed remotely and/or by the STB).

Figure 2:
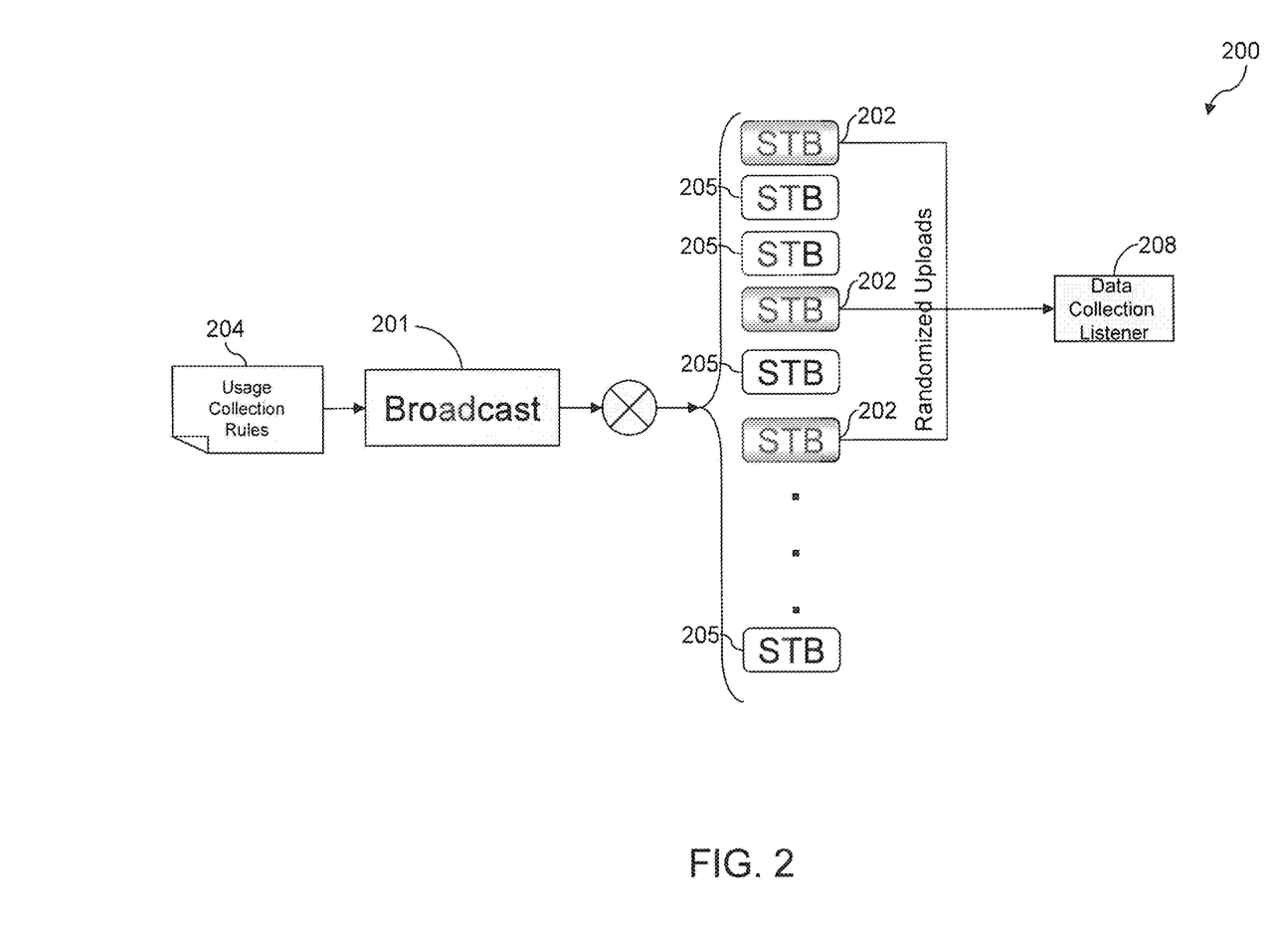
FIG. 2 is a block diagram of an architecture of a video system including randomized upload of viewing data according to an embodiment.

FIG. 2 illustrates a block diagram of an architecture of a video system 200 including randomized upload of viewing data from within a service-provider managed network according to an embodiment. System 200 includes headend 201 configured to broadcast to STBs 202 and 205 associated with households. For example, system 200 can involve a sample of more than 50,000 STBs 202 and 205 from which viewing data can be collected.

A benefit of embodiments described herein is that arrangements can involve changeable sample sizes and selection. Accordingly, a sample can be changed for various reasons. For example, if a particular demographic (e.g., age and household income) is not reflected in the sample, the sample can be changed to target that specific demographic, Additionally, the sample can be increased, to bring in more variety of household compositions and presumably include the target demographic in the increased sample. Because headend 201 broadcasts to a large number of households, any of those households, including all the households, can be included. Selective targeting of STBs 202 and 205 provides improved accuracy and precision, valuable for promotional and advertising purposes.

Headend 201 can broadcast usage collection rules 204 to the STBs 202 and 205. Usage collection rules 204 are evaluated by the STBs 202 and 205, and include rules regarding whether an STB should participate in data collection and/or upload activity. FIG. 2 illustrates headend 201 broadcasting the same usage collection rules 204 to all STBs 202 and 205 associated with the headend 201. Alternatively, embodiments can involve selective broadcasting of the usage collection rules 204 to specific STBs 202. Each of the STBs 202 and 205 evaluates the received usage collection rules 204, and determines whether to opt-in for data collection or upload activity based on applicable rules in the usage collection rules 204. As illustrated, STBs 202 opt-in to data collection activity, and STBs 205 do not opt-in.

Evaluation of usage collection rules 204 can involve various factors associated with households, including STBs 202 and 205. Factors can include zip code (3-digit or 5-digit), percentage of an entire sample (e.g., a random selection of one percent of all households), type of STB or Internet device (e.g., model number, computer type), a node ID associated with the STB, and other variables (e.g., variables stored in a computer or STB registry including serial number, MAC, home ID, etc.). Evaluation of the usage collection rules 204 can also involve Boolean combinations of factors. For example, usage collection rules 204 can specify that selection=10% of households AND (zip code=117* OR 118*), where * is a wildcard representing any additional characters. STBs 202 that opt-in to data collection activity can buffer the viewing data and randomly upload the viewing data to data collection listener 208. It is contemplated that STBs 202 that opt-in, and STBs 205 that do not opt-in, can buffer viewing data, and opting-in involves uploading the buffered viewing data. "Randomly" uploading can involve rules or intelligent algorithms that take into account aggregate network traffic, and predict the effect of uploading viewing data on the network. "Randomized" uploads can thereby distribute upload traffic among the STBs 202 to avoid network use spikes in the aggregate, and uploads may seem to occur randomly when considered from the perspective of an individual STB 202.

Figure 3:
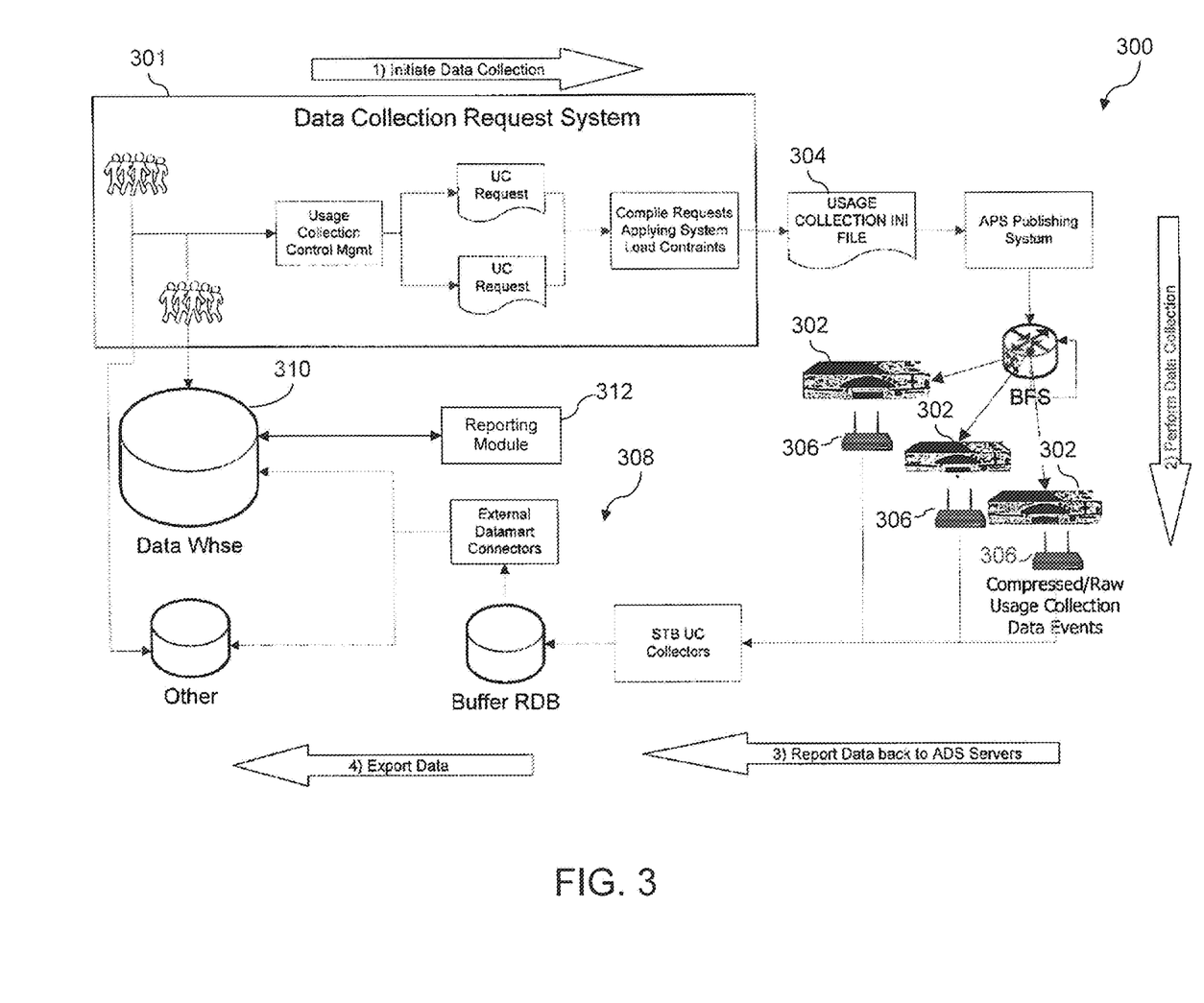
FIG. 3 is a block diagram of an architecture of a video system including collection of viewing data according to another embodiment.

FIG. 3 illustrates a block diagram of an architecture of a video system 300 including collection of viewing data 306 from within a service-provider managed network according to another embodiment, System 300 includes data collection request system 301 that distributes a usage collection file 304 to multiple STBs 302.

Based on the usage collection file 304, STBs 302 selectively collect and/or store usage collection data events and Internet usage events (viewing data 306). The viewing data 306 is collected by data collectors 308, and exported to data warehouse 310. Reporting module 312 can be in communication with data warehouse 310 to provide various reports based on viewing data 306 at data warehouse 310. Although one reporting module 312 is shown, multiple reporting modules can be provided in communication with various components and data of video system 300.

In accordance with the embodiments described above, an example system can collect second-by-second viewing records from many randomly selected and anonymous households. This includes anonymous tracking of viewing data including channel tuning events, capturing the date, time, channel and duration of the tuning event. This viewing data enables the statistical calculation of individual program share and viewership at frequent intervals (e.g., including an industry standard quarter-hour share) to determine commercial program value, as well as time-series tracking of anonymous sample households for the purpose of analyzing viewing behavior patterns, Analysis and Use of Viewing Data The anonymous viewing data from a selection of households can be combined with demographic and sociographic characteristics of the households on a de-identified basis. Anonymous information can include demographic composition, income, education, composition of household, lifestyle, behavioral, and product purchasing characteristics of households in a broadcast coverage area, without actually identifying specific individuals, Information can be organic, specifically anonymous viewer data relevant to providing cable. Internet and telecom services. Other information can be acquired via commercial sources, including standard household demographic data, purchased household segmentation data. Enhanced lifestyle data can enable ranking of networking/programming according to how likely audiences share the lifestyle characteristics of target consumers. The viewing data is thereby maintained anonymously, while providing the capability to understand and analyze the anonymous viewing data at a very detailed level, on a near real-time basis.

Data can be identified by metric name and category, identifications that can relate to aspects of information determined by analysis of viewing data (performed remotely and/or by the STB) and demographic and sociographic information/characteristics. The metrics, and other data/attributes, can be organized, analyzed, and presented in reports. The analysis can be done automatically, for example using a programmable machine learning algorithm to predict future behavior. Reports can be merged with various sort systems to manipulate the data for streamlined presentation of unique data and business intelligence, including microbehavior analysis. Reports can be provided by reporting modules 112 and 312 as shown in FIGS. 1 and 3, respectively. Multiple reporting modules can be provided, using the metrics and other data/attributes available throughout the exemplary video systems.

Reports can be generated based on categories such as network, household count, STB count, hours viewed count, total household percentage, total STB percentage, and hours viewed percentage. The data provides additional options for creating reports, including selecting start/end dates, a collection task sample (e.g., a sample of one percent of total), video tier, region (e.g., specific metro areas, broadcast coverage areas, product/sales region hierarchies), network, parent network, demographic attribute, zip code, start/end channel durations, cumulative duration (e.g., apply a 5/15 minute filter), and number of programs to include. Reports can be ranked based on various criteria/attributes to show details on the viewing data.

A first example report, audience by network (ranked by household count), can provide a list of networks in rank order of number of households viewing at any point during a user-selected time period. The first example report can be used to assess a specific network's reach during a period in time, and can be used to compare and contrast a set of networks. Ranking by household count can result in, for example, a news channel obtaining a high ranking. This ranking can be used to determine that households typically tune in to watch news. Additional details on viewer behavior regarding the news channel can be determined by using additional reports/ranking.

A second example report, audience by network (ranked by viewing duration), can provide a list of networks in rank order of number of hours viewed during a user-selected time period. The second example report can be used to assess a specific network's capture of viewing time during a period, and can be used to compare and contrast a set of networks. Ranking by viewing duration can result in, for example, the news channel obtaining a middle ranking. This ranking can be used to determine that households typically tune in to watch news for a brief duration, and then tune away. Various reports and rankings can be combined to develop very detailed micro-behaviors of audiences regarding viewed content.

A third example report, audience by network—combined SD-HD (ranked by household count), can be based on the first example report and also can automatically combine the high-definition (HD) and standard-definition (SD) version statistics for networks with HD versions. The third example report can be used, regardless of the split of viewership between HD and SD formats, to assess and compare/contrast networks as in the first example report. In the third example report, HD and SD viewership for each network can be represented by a single combined entry.

A fourth example report, audience by network—combined SD-HD (ranked by viewing duration), can be based on the second example report and also can automatically combine the HD and SD version statistics for networks with HD versions. The fourth example report can be used, regardless of the split of viewership between HD and SD formats, to assess and compare/contrast networks as in the second example report. In the fourth example report, HD and SD viewership for each network can be represented by a single combined entry.

A fifth example report, quarter hour share and rating, can be used to calculate ratings and/or a share of viewers for user-selected networks during each quarter-hour of a user-selected time period. The fifth example report can be used to assess a specific network's share/ratings over time, and to compare and contrast a set of networks. The fifth example report can be output as a graph depicting the household count, percent of household count (share), and rating for selected networks during each quarter hour period between selected start and end dates. The fifth example report can include combined SD/I-ID version statistics for networks with HD versions.

Additional example reports can be generated based on various criteria/categories of viewing data, including demographics. An additional report, audience by network with demographics, can describe viewers by network during a selected time period and according to selected demographic characteristics. This report can be used to assess a specific network's audience composition, comparing and contrasting a set of networks. Another report, program demographics, can describe the viewing audience for programs during a selected time period according to selected demographic characteristics. This report can be used to assess a specific program's audience composition, and can be used to compare and contrast a set of programs. Another report, quarter hour share with demographics, can be used as an enhancement to the fifth example report (quarter hour share and rating). This report can be used to calculate share of viewers for selected networks during each quarter-hour of a selected time period, adding the ability to select a specific demographic attribute to narrow the audience measured. It can be used to assess a specific network's share over time within a specific demographic, and to compare and contrast a set of networks. Reports can provide insights into viewing data by ranking each attribute and determining how it shows in an audience.

Viewing data can provide powerful diagnostics to television programmers. The significant sample size allows for understanding of small differences in actual viewing behavior within the viewing universes of numerous broadcast channels. Advertisers can target viewer characteristics using detailed selection to optimize ad inventory. Programmers can identify specific insights and applications, relative to their own audiences and their competitors audiences.

Accordingly, it is possible to optimize proof of performance and business intelligence. Regarding proof of performance, embodiments enable collecting of specific and detailed data to show that advertisers are justified in their spending for ads that reach their intended targets. Regarding business intelligence, embodiments enable specific and detailed data associated with expected yields for a given day/time ad or promo slot. Accordingly, a broadcaster can more accurately price a given timeslot based on specific data. Furthermore, a broadcaster can advise prospective advertisers as to which timeslots to target, based on the demographics, content to be broadcast, and other factors. Accordingly, ads and promos can be matched with targeted timeslots at an extremely accurate and precise level, based on detailed viewing data and/or sample selection of demographics.

Figure 4:
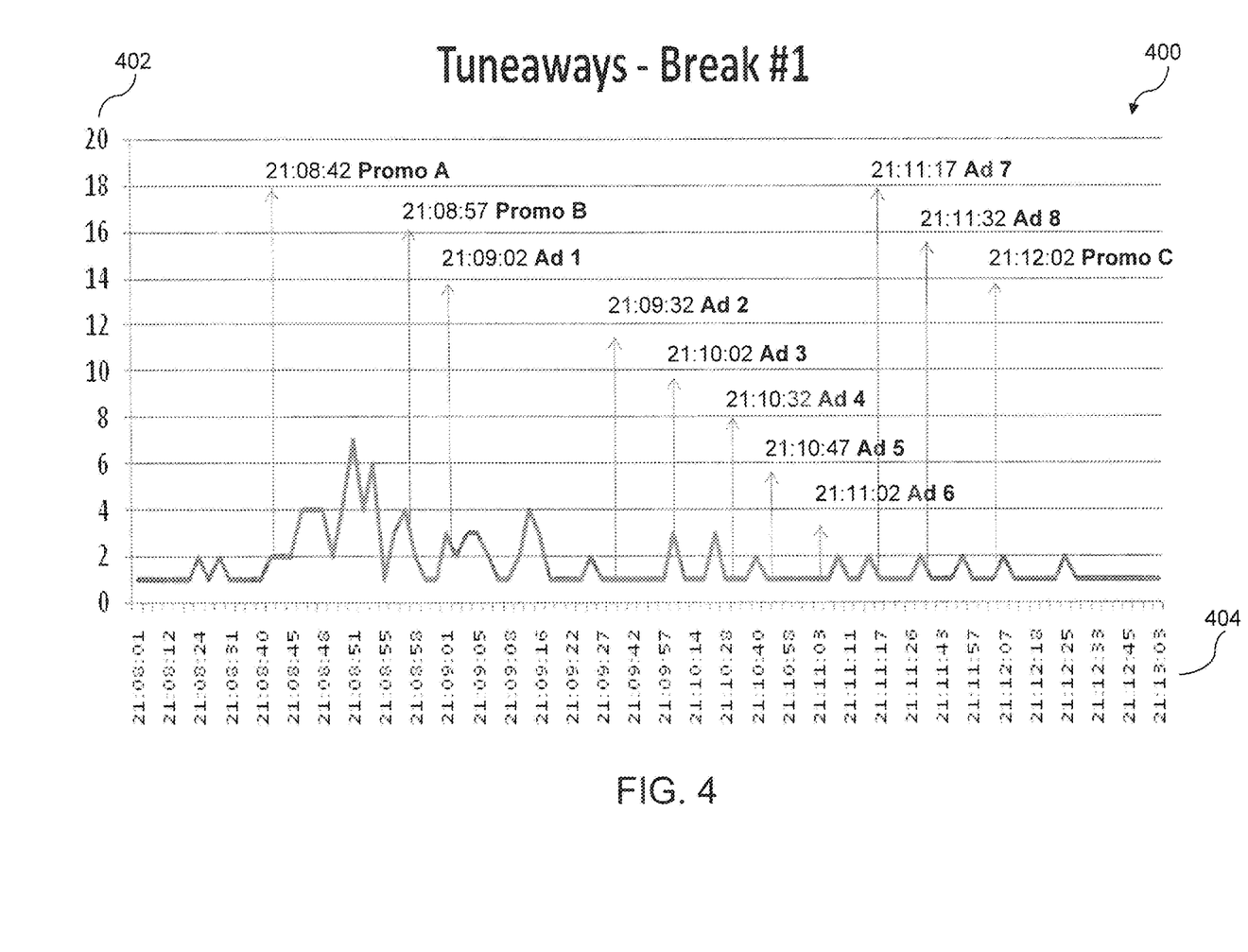
FIG. 4 is an example chart based on viewing data according to an embodiment.

FIG. 4 illustrates an example chart 400 based on viewing data according to an embodiment. Chart 400 illustrates the number of tuneaways 402 over time during a commercial break. The tuneaways 402 are associated with Promotional (Promo) spots A-C and Ads 1-8 occurring over time as identified by timestamps 404. Tuneaways 402 are incidents where a viewer issues a command to change the currently viewed channel. Embodiments of the system can include promo and ad descriptive information in the viewing data, along with timestamps. Embodiments can also obtain the promo and ad descriptive information from program content logs and as-run advertising logs, which identify the Promo spots A-C and Ads 1-8 with respect to timestamps 404 corresponding to timestamps of the viewing data.

Tuneaways 402 obtained from in-depth viewing data can therefore provide detailed viewer behavior throughout a broadcast, including during commercials, Tuneaways 402 at the second-by-second level allow mapping audience behavior to each second of programming and advertising content. Similar behavior can be obtained for Internet or telephonic activity associated with the household. For example, viewer data will indicate that a viewer watching a sports program tuned to a comedy program after ten minutes. This type of data can provide valuable insight if a large enough percentage of the sample audience did the same thing.

Analysis of viewing data enables the determination of detailed viewer behavior over time, including the ability to link events within a household. Household attributes include number of episodes viewed and number of minutes viewed. It is possible to create viewer profiles by using household attributes. Embodiments can therefore segment a program audience over an entire time span, e.g., broadcast season. Program audience segments can include, for example, "addicted" viewers watching eight or more premiere episodes live for a total of 300 or more minutes; "avid" viewers watching four to seven episodes for a total of 300 or more minutes; "frequent flyers" watching five to eleven partial episodes; "glued visitors" watching two to four mostly complete episodes; and "light samplers" watching up to sixty minutes over two to five episodes. Program audience segments enable identification of audience targeting opportunities. Therefore, it may be possible to reach, for example, two-thirds of active weekly premiere viewers by targeting "frequent fliers" and "glued visitors". Such information is valuable for proof of performance and business intelligence purposes, in negotiations between broadcasters and advertisers, program development, and promotion.

Viewing data can be used to enable Set Top Box Media Planning and Allocation, which can allow programmers to plan media by highest rated shows, networks, products and/or specific target audience characteristics. Such metrics can be used to identify viewership in low and non-rated networks. The metrics can also be used to maximize Gross Rating Point (GRP) selection, e.g., the size of an audience reached by a specific media vehicle or schedule, by finding and selecting across all networks, not just those that are highly rated.

Viewing data can also be used for Set Top Box Analytics, which can allow programmers and advertisers to find target audiences within the total viewership (for example, on over 500 individual networks) based on specific characteristics, identify competing networks, and find trends in network viewership.

Embodiments can enable the planning and placement of a broadcaster's internal marketing (cable cross channel) spots and external advertiser commercial spots. Planning and placement can be based on identification of characteristics of the target audience, using audience share calculations for each network of insertion by advertising zone or other ad insertion configuration, including specific dates and times.

Embodiments can also enable ranking of programs and networks based on share and viewership calculations. Ranking can allow maximum utilization of insertion inventory across the networks into which advertisements are inserted for a broadcaster or on behalf of external advertisers, by advertising zone or other ad insertion configuration.

Embodiments can report the actual movement of anonymous audiences in response to what they are watching, either programs or advertisements, including Internet activity. Multiple viewing events from a single household can be linked together in time series, and correlated with Internet or other activities.

The various analyses of the embodiments described herein provide diagnostic data to expand audience and behavioral insights. For example, embodiments can, determine details regarding broadcasted programs, series, and channels. The details can include anonymously determining who is watching what at the program level, within and across series and channels. Embodiments enable determining statistical differences between audiences for individual programs; and the regularity with which individual viewing households view series installments.

Embodiments can determine details regarding audience composition and behavior. For example, embodiments can determine audience flow, including determining from where audiences tuned when arriving at a channel, and to where audiences tune when departing the channel. Such information enables coordinating the information from as-run ad logs with tuneaways at a second-by-second level, for example. Embodiments can include audience discovery, determining what would be a typical viewer of a given program or advertisement, and determining what other programs or advertisements the viewer typically watches. For example, weekly premiere viewers of a show can be identified and profiled for reaching potential viewers. Embodiments can determine audience behavior, including the loyalty of a given household/viewer to a specific channel as compared to its competitors. Determining audience behavior can also include determining percentage of total viewing time spent on a specific channel versus its competitors. Audience behavior can be used to assess audience loyalty via viewing frequency analysis, to create loyalty segments.

Embodiments can also enable audience hunting, including examining viewing habits of active viewer segments to identify promo placement opportunities to reach potential viewers. Therefore, it is possible to understand and maximize the current audience, and find and attract undiscovered audiences. Regarding the current anonymous audience, it is possible to determine what else the current anonymous audience is watching. It is also possible to determine where and how to entice the current anonymous audience to watch more often. Regarding undiscovered audiences, it is possible to determine other viewers having interests similar to the current anonymous audience, including what the other viewers are watching and where/how to entice them to discover and watch a given program or advertising.

Detailed audience intelligence, determined by analyzing viewing data, can be used not only for content development and creation, but also in assisting programmers to find the appropriate audience for already-developed content. By using the viewing data to determine detailed audience composition, behavior, preferences, etc., content developers can customize the content and programming that they invest in developing. For example, a content developer can determine that an audience is receptive to a particular product placement, actor, or other content/feature based on viewing data. The content developer can incorporate that product placement and/or actor in the content being developed, and the audience is likely to be more receptive to that content. The richness of viewing data provides analysis on a detailed, micro-behavioral level for an audience. Detailed intelligence on audiences can enable the content developer to increase the likelihood that many detailed aspects of programming content will be successfully received, and decrease the likelihood of developing a show, content, programming, etc. that "flops" when broadcast to an audience.

Embodiments can also determine promo effectiveness to improve return on investment and anonymous micro-behavior insights. For example, embodiments can determine sub-program level analyses, minute by minute or second by second. Accordingly, it is possible for embodiments to determine how well a given program or advertisement holds an anonymous audience, or stimulates tune-ins to that program or advertisement. It is also possible to determine the effect of devices such as interactive overlays, based on the corresponding Internet activity that correlates with the timing of the interactive overlay. By determining which promo spots were associated with a higher tune-in rate, promo effectiveness and return on investment can be improved.

Embodiments can facilitate the use of data collected and/or analyzed in near real-time, for specifically targeting advertising and promotions to the particular audience while using the STB. For example, viewing data from a STB and Internet usage can be collected, and based on the data, ads and promos can be served to the STB in near real-time. Accordingly, embodiments can maximize the effectiveness of promos and ads, without a need to predict in advance the target audience likely to be using the STB.

Figure 5:
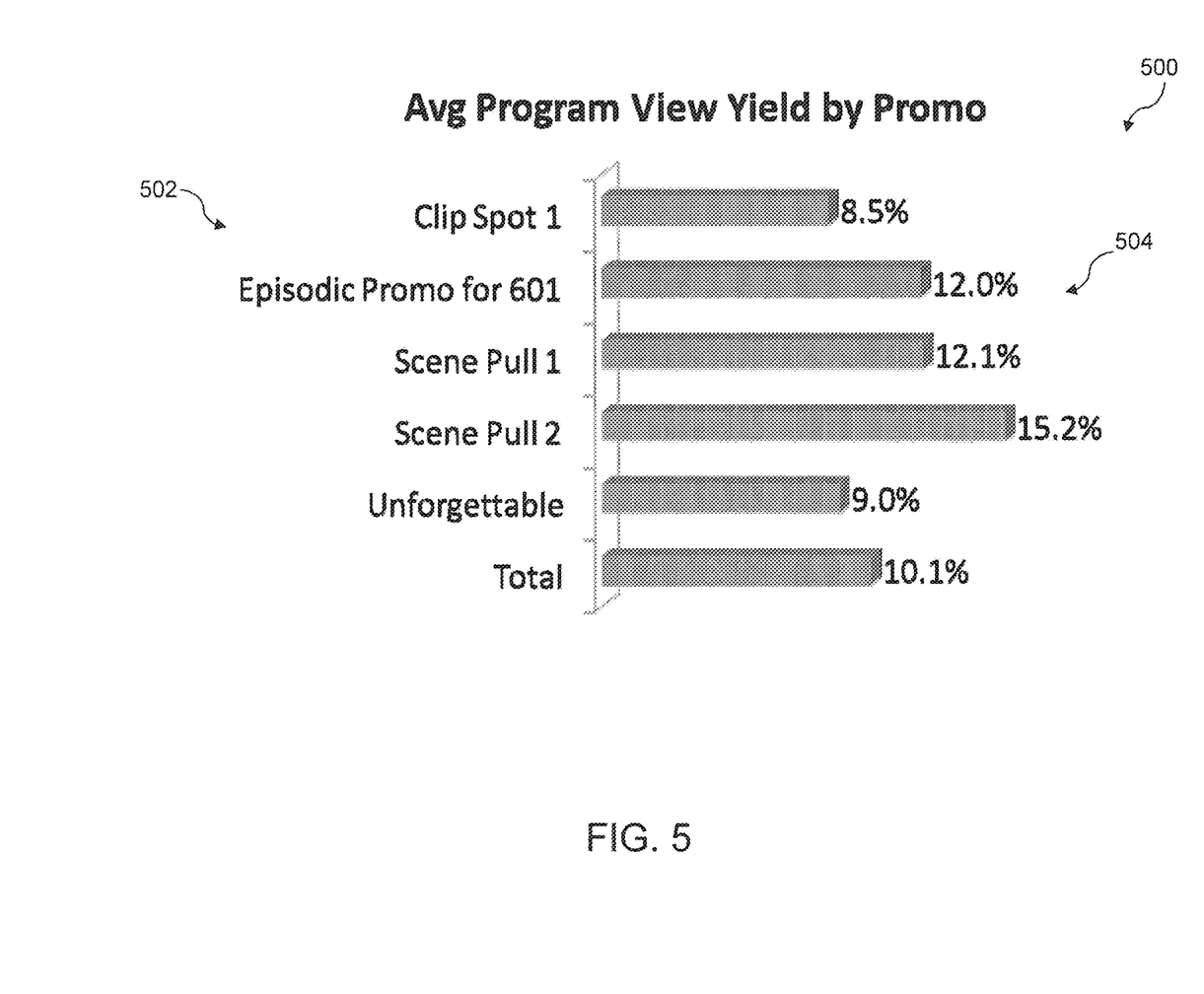
FIG. 5 is an example chart based on viewing data according to an embodiment.

FIG. 5 is an example chart 500 based on viewing data according to an embodiment. Viewing data can be analyzed for viewership of specific promo spots 502, with respect to other viewing patterns of those users viewing promo spots 502. For example, viewership of a specific promo spot 502 can be compared with viewership of the promoted program, and other of the specific promo spots 502, to determine which of the anonymous viewers of the promo spots 502 eventually watched the promoted item. For example, analyzing viewing data can enable identification of viewers of promo spots over various days of the week leading up to the airing of the promoted program. When the program is broadcast, viewing data can enable identification of viewers of the program who previously viewed the promo spots.

Embodiments enable determination of a view yield or promo yield 504. Yield 504 can be considered in determining whether a spot has a higher tune-in rate, and therefore is presumed more effective. Accordingly, it is possible to enable analysis of yield and return on investment of the promo spots, valuable in establishing proof of performance. For example, embodiments can determine that promo yield can be significantly improved by placement of promo spots on the same day of the week as the promoted program. Additionally, embodiments can determine that same-day promo yield and 7-day advance promo yield can significantly exceed overall average yield. Analysis of viewing data therefore enables calculation of an effective yield of program viewers from specific promo airings. Furthermore, it is possible to optimize promo scheduling, based on day of the week and/or time of the day, valuable for business intelligence.

Embodiments can identify, capture, and account for variables that affect the performance of promos. Analysis thereby provides a valuable view of individual promo performance. For example, promos can be aired at various times of the day and days of the week. By indexing and/or weighting each airing of an individual promo, it is possible to determine how each promo benefits from a given day or time placement mix. Such information is valuable for adjusting prices charged for promo or ad placement, customized for the particular promo or ad and day or time placement. Proof of performance and business intelligence can thereby be optimized.

Accordingly, embodiments enable determination of return on investment including expected yield for a given content of the promo or ad, and for a given insertion day/time mix. Therefore, promotional dollars and cross-channel value can be maximized.

Embodiments can use programmable machine learning algorithms for real-time prediction of future viewer behavior patterns. Example algorithms can be implemented as a Bayesian network or a Hidden Markov Model, for example. Algorithms can acquire channel tuning and viewing activities, and automatically compute an optimal viewing pattern graph out of the universe of all viewing activities, as a function of time. The algorithms can output a predicted or maximum likelihood estimator of channel/service/time state vector. Cluster analysis can be performed to generate a list of predicted channel/services by groups, clustering users into groups that are likely to watch or tune to a specified destination at a specified time. Embodiments can be adapted for applications where future behavior, e.g., in a probabilistic sense, can be leveraged to improve service, value, or revenues. Results of machine analysis can be utilized for optimal ad placement, maximizing customer impression yields, increasing value to advertisers by providing a greater known probability of reaching a larger audience, and offering such business intelligence at a premium charge.

The algorithms can be implemented on a system, and can be implemented as a distributed stochastic learning agent model that operates on embedded devices such as STBs and other devices. Client agent processes can be distributed and executed concurrently on multiple embedded devices participating as a system. An initialization phase can be used to distribute (scatter) operating parameters to embedded devices for the machine learning algorithm. Output from the distributed agents can be sent to a remote system, e.g., a server system in the Cloud, for processing that can include cluster analysis.

Figure 6:
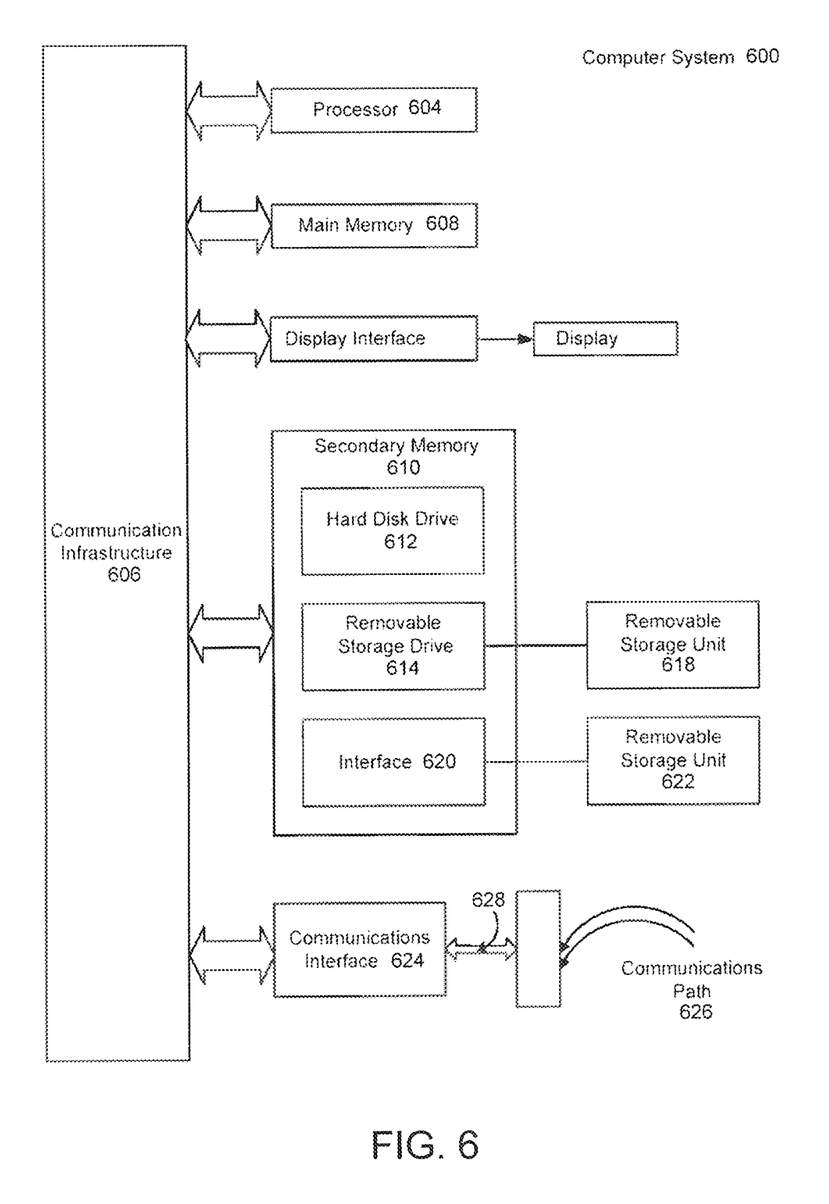
FIG. 6 is a block diagram of an exemplary computer system on which embodiments can be implemented.

FIG. 6 is a schematic diagram of an example computer system 600 used to implement embodiments of the STB 102, headend 101, data collection system 301, data collectors 108, data warehouse 110, and/or other systems. Various aspects of the various embodiments can be implemented by software, firmware, hardware, or a combination thereof. FIG. 6 illustrates an example computer system 600 in which an embodiment, or portions thereof, can be implemented as computer-readable code. Various embodiments are described in terms of this example computer system 600. After reading this description, it will become apparent to a person skilled in the relevant art how to implement embodiments using other computer systems and/or computer architectures.

Computer system 600 includes one or more processors, such as processor 604. Processor 604 can be a special purpose or a general purpose processor. Processor 604 is connected to a communication infrastructure 606 (for example, a bus or network).

Computer system 600 also includes a main memory 608, preferably random access memory (RAM), and may also include a secondary memory 610. Secondary memory 610 may include, for example, a hard disk drive 612 and/or a removable storage drive 614. Removable storage drive 614 may comprise a floppy disk drive, a magnetic tape drive, an optical disk drive, a flash memory, or the like. The removable storage drive 614 reads from and/or writes to a removable storage unit 618 in a well known manner. Removable storage unit 618 may comprise a floppy disk, magnetic tape, optical disk, etc. which is read by and written to by removable storage drive 614. As will be appreciated by persons skilled in the relevant art(s), removable storage unit 618 includes a tangible computer readable storage medium having stored therein computer software and/or data.

In alternative implementations, secondary memory 610 may include other similar means for allowing computer programs or other instructions to be loaded into computer system 600. Such means may include, for example, a removable storage unit 622 and an interface 620. Examples of such means may include a program cartridge and cartridge interface (such as that found in video game devices), a removable memory chip (such as an EPROM, or PROM) and associated socket, and other removable storage units 622 and interfaces 620 which allow software and data to be transferred from the removable storage unit 622 to computer system 600.

Computer system 600 may also include a communications interface 624. Communications interface 624 allows software and data to be transferred between computer system 600 and external devices. Communications interface 624 may include a modem, a network interface (e.g., an Ethernet card), a communications port, a PCMCIA slot and card, or the like. Software and data transferred via communications interface 624 are provided to communications interface 624 via a communications path 626. Communications path 626 may be implemented using wire or cable, fiber optics, a phone line, a cellular phone link, an RF link or other communications channels.

In this document, the terms "computer program medium" and "computer usable medium" are used to generally refer to media such as removable storage unit 618, removable storage unit 622, and a hard disk installed in hard disk drive 612. Computer program medium and computer usable medium can also refer to memories, such as main memory 608 and secondary memory 610, which can be memory semiconductors (e.g. DRAMs, etc.). These computer program products are means for providing software to computer system 600.

Computer programs (also called computer control logic) are stored in main memory 608 and/or secondary memory 610. Computer programs may also be received via communications interface 624. Such computer programs, when executed, enable computer system 600 to implement embodiments as discussed herein, such as the system described above. In particular, the computer programs, when executed, enable processor 604 to implement the processes of embodiments. Accordingly, such computer programs represent controllers of the computer system 600. Where embodiments are implemented using software, the software may be stored in a computer program product and loaded into computer system 600 using removable storage drive 614, interface 620, hard drive 612 or communications interface 624.

Described above are systems, apparatuses, and methods for use of viewing data, and applications thereof it is to be appreciated that the Detailed Description section, and not the Abstract, is intended to be used to interpret the claims. The Abstract may set forth one or more but not all exemplary embodiments of the present invention as contemplated by the inventors, and thus, are not intended to limit the present invention and the appended claims in any way.

Embodiments have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

What is claimed is:

1. A method for collecting viewing data within a service-provider managed network, comprising:
   instructing, by a centralized entity within the service-provider managed network, an electronic platform from among a plurality of electronic platforms within the service-provider managed network to collect the viewing data regarding actions taken by a subscriber associated with the electronic platform that are greater than or equal to a dwelling time in duration;
   receiving, by the centralized entity from the electronic platform, the viewing data from the electronic platform, the viewing data including an anonymous tracking number corresponding to the electronic platform and information regarding the electronic platform, wherein the electronic platform cannot be specifically identified from among the plurality of electronic platforms using the anonymous tracking number; and
   determining, by the centralized entity based on the information, an advertisement or a promotional spot for a timeslot associated with the viewing data.

2. The method of claim 1, wherein the electronic platform comprises:
   a set top box;
   a personal computer;
   a cellular telephone;
   a personal digital assistant (PDA);
   a tablet;
   an Internet Protocol (IP)-based telephone using voice over IP (VOIP);
   a digital video recorder (DVR);
   a remote-storage DVR;
   a video on-demand (VOD) system; or
   an interactive television system.

3. The method of claim 1, wherein the viewing data is associated with interaction of the subscriber with the Internet.

4. The method of claim 1, wherein the determining comprises:
   identifying a characteristic of the electronic platform based on the information; and
   targeting the advertisement or the promotional spot toward the characteristic of the electronic platform when the characteristic of the electronic platform matches a characteristic of at least one other electronic platform within the service-provider managed network.

5. The method of claim 4, wherein the characteristic comprises:
   a type of the electronic platform.

6. The method of claim 1, further comprising:
   selecting, by the centralized entity, a subset of electronic platforms from among the plurality of electronic platforms within the service-provider managed network having a particular demographic; and
   selecting, by the centralized entity, the electronic platform from among the subset of electronic platforms.

7. The method of claim 1, wherein the determining comprises:
   combining the viewing data with a demographic characteristic or a sociographic characteristic of the subscriber;
   receiving a report having a plurality of ranks corresponding to a plurality of advertisements or a plurality of promotional spots for the timeslot associated with the viewing data, the plurality of ranks being related to the demographic characteristic or the sociographic characteristic; and
   selecting the advertisement or the promotional spot based upon the plurality of ranks.

8. A centralized entity within a service-provider managed network for collecting viewing data within the service-provider managed network, the centralized entity comprising:
   a memory configured to store instructions; and
   a processor, coupled to the memory, configured to execute the instructions, the instructions, when executed by the processor, configuring the processor to:
      instruct an electronic platform from among a plurality of electronic platforms within the service-provider managed network to collect the viewing data regarding actions taken by a subscriber associated with the electronic platform that are greater than or equal to a dwelling time in duration,
      receive the viewing data from the electronic platform, the viewing data including an anonymous tracking number corresponding to the electronic platform and information regarding the electronic platform, wherein the electronic platform cannot be specifically identified from among the plurality of electronic platforms using the anonymous tracking number, and determine an advertisement or a promotional spot for a timeslot associated with the viewing data.

9. The centralized entity of claim 8, wherein the centralized entity comprises:
a headend of the service-provider managed network.

10. The centralized entity of claim 8, wherein the electronic platform comprises:
a set top box;
a personal computer;
a cellular telephone;
a personal digital assistant (PDA);
a tablet;
an Internet Protocol (IP)-based telephone using voice over IP (VOIP);
a digital video recorder (DVR);
a remote-storage DVR;
a video on-demand (VOD) system; or
an interactive television system.

11. The centralized entity of claim 8, wherein the viewing data is associated with interaction of the subscriber with the Internet.

12. The centralized entity of claim 8, wherein the instructions, when executed by the processor, further configure the processor to:
identify a characteristic of the electronic platform based on the information; and
target the advertisement or the promotional spot toward the characteristic of the electronic platform when the characteristic of the electronic platform matches a characteristic of at least one other electronic platform within the service-provider managed network.

13. The centralized entity of claim 12, wherein the characteristic comprises:
a type of the electronic platform.

14. The centralized entity of claim 8, wherein the instructions, when executed by the processor, further configure the processor to:
select a subset of electronic platforms from among the plurality of electronic platforms within the service-provider managed network having a particular demographic; and
select the electronic platform from among the subset of electronic platforms.

15. The centralized entity of claim 8, wherein the instructions, when executed by the processor, further configure the processor to:
combine the viewing data with a demographic characteristic or a sociographic characteristic of the subscriber;
receive a report having a plurality of ranks corresponding to a plurality of advertisements or a plurality of promotional spots for the timeslot associated with the viewing data, the plurality of ranks being related to the demographic characteristic or the sociographic characteristic; and
select the advertisement or the promotional spot based upon the plurality of ranks.

16. A centralized entity within a service-provider managed network for collecting viewing data within the service-provider managed network, the centralized entity comprising:

a memory configured to store instructions; and
a processor, coupled to the memory, configured to execute the instructions, the instructions, when executed by the processor, configuring the processor to:
select a subset of electronic platforms from among a plurality of electronic platforms within the service-provider managed network having a particular demographic,
select an electronic platform from among the subset of electronic platforms,
instruct the electronic platform to collect the viewing data regarding interaction of a subscriber associated with the electronic platform with the Internet that are greater than or equal to a dwelling time in duration, and
receive the viewing data from the electronic platform, the viewing data including an anonymous tracking number corresponding to the electronic platform, wherein the electronic platform cannot be specifically identified from among the subset of electronic platforms using the anonymous tracking number.

17. The centralized entity of claim 16, wherein the electronic platform comprises:
a set top box;
a personal computer;
a cellular telephone;
a personal digital assistant (PDA);
a tablet;
an Internet Protocol (IP)-based telephone using voice over IP (VOIP);
a digital video recorder (DVR);
a remote-storage DVR;
a video on-demand (VOD) system; or
an interactive television system.

18. The centralized entity of claim 16, wherein the instructions, when executed by the processor, further configure the processor to:
identify a characteristic of the electronic platform based on the viewing data; and
target an advertisement or a promotional spot for a timeslot associated with the viewing data toward the characteristic of the electronic platform when the characteristic of the electronic platform matches a characteristic of at least one other electronic platform within the service-provider managed network.

19. The centralized entity of claim 18, wherein the characteristic comprises:
a type of the electronic platform.

20. The centralized entity of claim 16, wherein the instructions, when executed by the processor, further configure the processor to:
combine the viewing data with a demographic characteristic or a sociographic characteristic of the subscriber;
receive a report having a plurality of ranks corresponding to a plurality of advertisements or a plurality of promotional spots for the timeslot associated with the viewing data, the plurality of ranks being related to the demographic characteristic or the sociographic characteristic; and
select an advertisement or a promotional spot for a timeslot associated with the viewing data based upon the plurality of ranks.

* * * * *